(12) United States Patent
Sandmeyer et al.

(10) Patent No.: US 9,022,448 B2
(45) Date of Patent: May 5, 2015

(54) INNER LINING PART

(71) Applicant: Faurecia Innenraum Systeme GmbH, Hagenbach (DE)

(72) Inventors: Ulrich Sandmeyer, Dahn (DE); Harald Peter, Unterhaching (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/016,690

(22) Filed: Sep. 3, 2013

(65) Prior Publication Data

US 2014/0167440 A1    Jun. 19, 2014

(30) Foreign Application Priority Data

Sep. 3, 2012    (DE) .......................... 10 2012 017 399

(51) Int. Cl.
*B60R 13/02*    (2006.01)

(52) U.S. Cl.
CPC ............. *B60R 13/0243* (2013.01); *B60R 13/02* (2013.01)

(58) Field of Classification Search
USPC ............. 296/1.08, 70, 146.7; 264/258; 29/91, 29/91.1
See application file for complete search history.

(56) References Cited

U.S. PATENT DOCUMENTS

| 4,779,390 | A  | * | 10/1988 | Repper et al. ................... 52/222 |
| 5,297,842 | A  | * | 3/1994 | Hayashi ..................... 296/146.7 |
| 6,092,854 | A  | * | 7/2000 | Campbell ........................ 296/70 |
| 6,214,157 | B1 | * | 4/2001 | Spengler .................... 156/304.6 |
| 7,556,852 | B2 | * | 7/2009 | Aoki et al. ..................... 428/172 |
| 2007/0193673 | A1 | * | 8/2007 | Aoyama et al. .................. 156/71 |
| 2010/0171333 | A1 | * | 7/2010 | Smith et al. .................. 296/1.08 |
| 2012/0261934 | A1 |   | 10/2012 | Dyckerhoff et al. |

FOREIGN PATENT DOCUMENTS

DE    102009060338    6/2011

* cited by examiner

*Primary Examiner* — Glenn Dayoan
*Assistant Examiner* — Jason S Daniels
(74) *Attorney, Agent, or Firm* — Reising Ethington P.C.

(57) ABSTRACT

An inner lining part for the interior of a motor vehicle, wherein the inner lining part has a carrier part, which comprises a curvature section, with a curvature running along a longitudinal direction of the carrier part. The curvature section includes a carrier part groove running in the longitudinal direction. A decorative layer overlies a first surface of the carrier part and forms a visible face of the inner lining part. The decorative layer covers the carrier part groove, thereby forming a decorative layer groove on the visible face of the inner lining part. Recesses in one or more portions of the carrier part at the carrier part groove receive folds or thickenings of the decorative layer to thereby permit the visible face of the decorative layer at the decorative layer groove to match the curvature of the curvature section at carrier side regions located adjacent the groove.

19 Claims, 6 Drawing Sheets

INNER LINING PART

TECHNICAL FIELD

The invention relates to an inner lining part, in particular an interior lining part of a motor vehicle.

BACKGROUND

From DE 10 2009 060 338 A1 an inner lining part of a vehicle is known, in which a carrier component comprises a groove running longitudinally in a component section. The groove receives two margin sections of two decorative layers which meet together in the region of the groove.

An object of the present invention is to provide an inner lining part with a carrier part and with a decorative layer situated thereon of high quality haptically and visually, which inner lining part has a curvature extending extensively and in the decorative layer of which a groove is formed running along the region of this curvature.

SUMMARY

According to one aspect of the invention, an inner lining part is provided for the interior of a motor vehicle, wherein the inner lining part comprises a carrier part which has a curvature section with a curvature running along a longitudinal direction of the carrier part and a carrier part groove running in longitudinal direction in the region of the curvature section. The curvature section can be constructed so as to be convex when viewed from a visible face of the inner lining part, wherein the carrier part groove opens towards the visible face. The inner lining part comprises a decorative layer lying on a first surface of the carrier part facing the visible face, wherein the decorative layer covers the carrier part groove in the region of the curvature section transversely to the longitudinal direction. In particular, the decorative layer lies therein against the carrier part groove. In this way, the decorative layer forms a decorative layer groove on the visible face of the inner lining part.

According to an embodiment of the inner lining part, the decorative layer is formed in a single layer. Here, the decorative layer can be formed in particular from leather or artificial leather.

According to an embodiment of the inner lining part, the decorative layer is formed from a covering film and a foam layer situated between the covering film and the carrier part.

According to an embodiment of the inner lining part, provision is made that at least one of two corner regions of the carrier part lying opposite one another in the curvature section, from which regions the carrier part groove, situated between two carrier part side regions, extends as a depression, comprises a recess constructed with respect to the course of the curvature of the curvature section in the respective corner region and in particular extending in the longitudinal direction. Thereby, the cross-section profile line of the first surface of the carrier part in the respective corner region, occurring in the longitudinal direction, has a shape which forms along the longitudinal direction relative to an adjacent cross-section profile line situated in at least one of the carrier part side regions and occurring in the longitudinal direction. Thereby, the course of a first surface of the decorative layer facing the visible face of the inner lining part corresponds to the course of the curvature in the carrier part side regions, because folds or thickenings which form owing to the curvature of the decorative layer on the second surface thereof are received by the respective recess. A first surface of the decorative layer therefore forms the visible face of the inner lining part. The recess is constructed such that into it folds or thickenings are received which form owing to the curvature on the second surface of the decorative layer, which is oriented opposed to the first surface thereof, so that the first surface of the decorative layer in the respective corner region corresponds to the course of the curvature in the carrier part side regions.

According to an embodiment of the inner lining part, provision is made that the carrier part groove situated between two carrier part side regions is formed from two side flanks lying opposite one another and a groove base surface connecting these, and in the curvature section comprises in at least one side flank a recess extending in the longitudinal direction.

According to an embodiment of the inner lining part, provision is made that the carrier part groove situated between two carrier part side regions is formed from two side flanks lying opposite one another and a groove base surface connecting these, and in the curvature section in the groove base surface or in the transition region between groove base surface and at least one side flank comprises a recess extending in the longitudinal direction. In this way, the cross-section profile line of the first surface of the carrier part in the respective corner region has a shape relative to an adjacent one situated in at least one of the carrier part side regions and occurring in the longitudinal direction.

According to an embodiment of the inner lining part, the carrier part groove is formed in rectangular shape in cross-section. According to another embodiment of the inner lining part, the carrier groove is formed in a V-shape in cross-section.

According to an embodiment of the inner lining part, the inner lining part is a door lining part of a vehicle door. Here, the inner lining part can be configured such that the carrier part groove runs on the inner lining part such that it extends in relation to a state of the inner lining part incorporated in a vehicle along the X-direction of the vehicle or between a margin section of the vehicle door, on which the vehicle door is rotatably hung on the vehicle body, and a free pivotable margin section of the vehicle door.

An advantage of the disclosed embodiments is that an inner lining part is provided which comprises an entirely smooth decorative layer towards the interior of the vehicle, without any projection. This makes possible the covering of a three-dimensionally curved carrier part with groove with a decorative layer which on its outer side facing the visible face comprises no local changes in thickness in its planar extent.

According to at least one embodiment of an inner lining part according to the invention, the carrier part comprises a groove and the decorative layer, which is laminated on the carrier component, extends as a single-piece layer over the groove and lies here also against the inner surfaces of the groove and in particular its inner side surfaces and the groove base surface situated between these.

According to a particularly advantageous embodiment, at least one additional depression is provided on the carrier component in the region of the groove. By one or more of such depressions, folds which form on inserting of the decorative layer into the groove can escape into the depressions on the rear side of the decorative layer facing the carrier component and therefore are not displayed on visible face of the decorative layer pointing towards the interior. Advantageously, the depressions are arranged in the region of an edge of the groove. This applies in particular to edges in the region of the base of the groove, where the tendency to folding of the decorative layer is greatest. The depressions can have a rounded shape in cross-section, particularly advantageously in the form of a circular arc.

The inner lining part is suitable in particular for a use as a door lining component of a vehicle door. Here, with the vehicle door closed, the groove is constructed as a reinforcement or as a design feature on the carrier component, preferably running horizontally in the fore-and-aft (X) direction. The groove preferably extends over the entire first and second component section with the transition section.

BRIEF DESCRIPTION OF THE DRAWINGS

Embodiments according to the invention are described below with the aid of the enclosed figures, which show:

FIG. 1b an enlarged cutout of the perspective diagrammatic representation of the carrier part of FIG. 1a;

DESCRIPTION OF THE ILLUSTRATED EMBODIMENTS

Figure 1A:
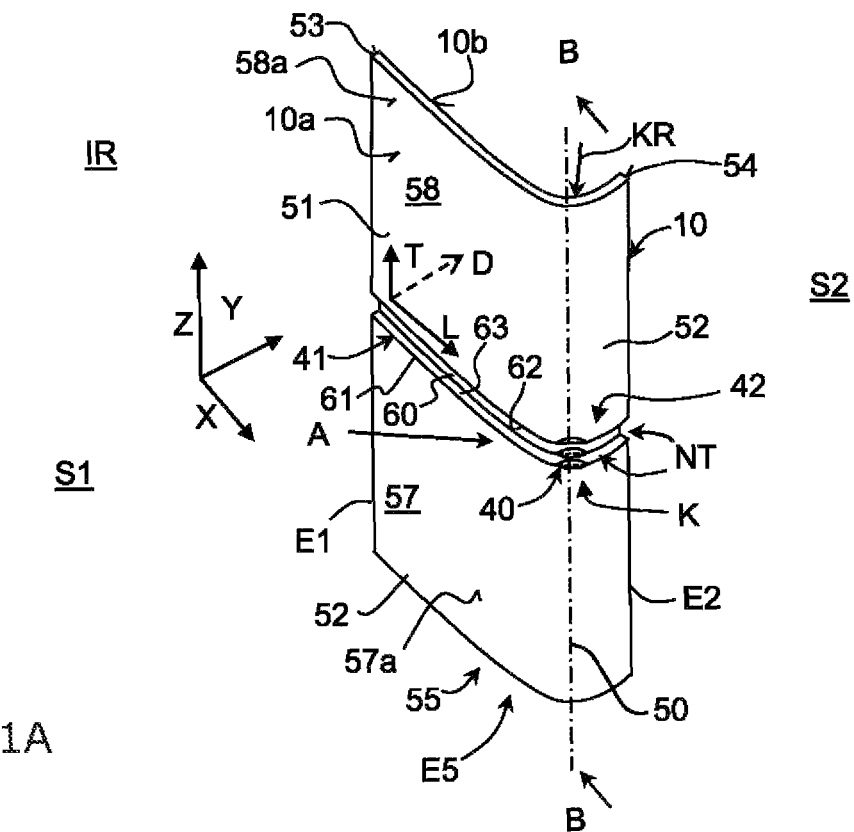
FIG. 1a a perspective diagrammatic representation of a carrier part of an embodiment of the door lining part according to the invention, wherein the carrier part comprises a carrier part groove running in a longitudinal direction of the carrier part.
Figure 1B:
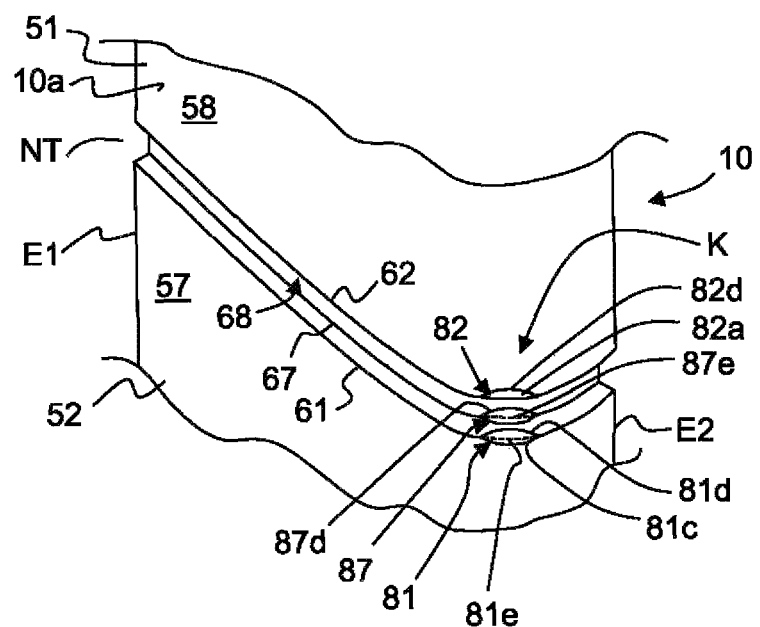

With reference to FIGS. 1a and 1b, an inner lining part 1 comprises a carrier part 10 and a decorative layer 20 situated thereon. The decorative layer 20 comprises a first surface 20a and a second surface 20b oriented contrary thereto, which lies against a first surface 10a of the carrier part 10. The first surface 20a of the decorative layer 20 therefore forms an outer side of the inner lining part 1 in its installed state viewed from a visible face 51 and faces here the interior IR of the vehicle. The carrier part 10 comprises a second surface 10b or a carrier part rear side viewed from a rear side S2, which is situated contrary to its first surface 10a.

Figure 4:
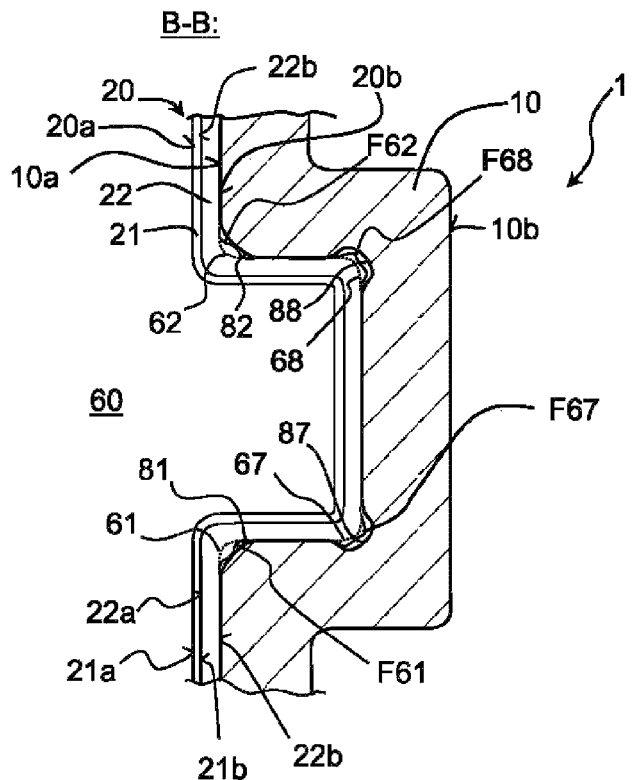
FIG. 4 a partial section of an embodiment of the inner lining part according to the invention, corresponding to the illustration of FIG. 3, with the carrier part illustrated in FIG. 3 and with a decorative layer situated thereon.
Figures 5, 6:
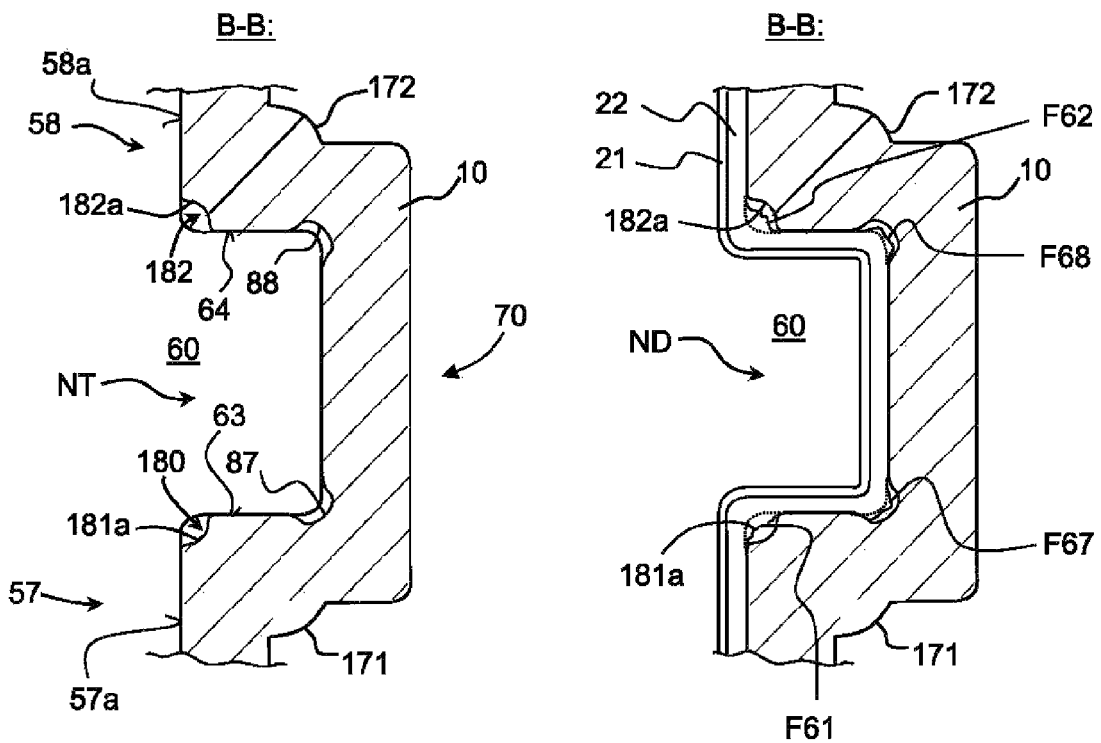
FIG. 5 a partial section of a further embodiment of the carrier part along the section line B-B entered in FIG. 1, wherein the illustrated carrier part is a further specialization of the carrier part illustrated diagrammatically in FIG. 1 or respectively 3, and wherein the partial section is made in a region of the carrier part in which the carrier part has a curvature extending extensively along the longitudinal direction of the carrier part.
FIG. 6 a partial section of an embodiment of the inner lining part according to the invention corresponding to the illustration of FIG. 5, with the carrier part illustrated in FIG. 5 and with a decorative layer situated thereon.

The decorative layer 20 can be formed in a single layer. This can be the case in particular when the decorative layer is a leather blank or an artificial leather blank. Alternatively, —as is illustrated in FIGS. 4 and 6—, the decorative layer 20 can be formed from a covering film or decoration film 21, the first surface of which is the first surface 20a of the decorative layer 20, and from an intermediate layer 22. In particular, provision can be made that the decorative layer 20 consists of a covering film 21 and a foam layer 22. Here, a second surface 21b of the covering film 21, oriented contrary to the first surface 21a, lies against a first surface of the foam layer 22. The intermediate layer 22 comprises a second surface 22b oriented contrary to the first surface 22a thereof, which second surface lies against the first surface 10a of the carrier part 10.

Generally, the inner lining part 1 can be a door lining. The inner lining part 1 can also be an instrument panel or a part thereof. In a further case of application, the inner lining part 1 can be a cover of a centre console.

The carrier part 10 can be formed from polypropylene (PP), which can contain natural fibres, ceramic fibres, carbon fibres or glass fibres or a combination thereof. The carrier part 10 can also be formed from an ABS plastic material (acrylonitrile butadiene styrene copolymer plastic) or polyurethane.

The intermediate layer 22 can be formed in particular as a reinforcement layer which comprises in particular a layer of glass fibre fabric which can be situated between the material layer and the decorative layer or beneath the carrier layer, i.e. on the side of the carrier layer situated contrary to the side facing the decorative layer. The intermediate layer 22 can also be formed as a foam layer and in particular as a PU (polyurethane) foam. Also, such a foam layer can be formed from polyolefin and in particular from a thermoplastic olefin (TPO). The use of a foam layer as intermediate layer 22 is to produce an improved surface feel of the finished, i.e. produced inner lining part 1 or decorative part in the region of the base decorative layer.

The covering film 21 can be formed in particular from a textile layer. Also, this can be formed from leather or artificial leather. Alternatively, the decorative layer can be a compact film. The foil layer can be formed in particular from TPO (thermoplastic polyolefin) or from PVC (polyvinyl chloride).

The decorative layer 20 can also be formed from or consist of more than two layers. For example, the decorative layer 20 can be formed from a covering film 21 and a foam layer and of a reinforcement layer in particular of the previously described type, situated between these.

The production of the inner lining part 1 can take place in particular by a compression moulding method. Here, the carrier part 10 can be formed as a solid shaped part, i.e. rigid in itself and in particular hardened, as starting material, onto which a decorative layer 20 is laminated. Provision can be made here that the stable carrier part 10 is inserted into a moulding tool (not illustrated in the figures), which comprises a first tool part with a first shaping contour surface and a second tool part with a second shaping contour surface. For example, the carrier part 10 is placed onto the first shaping contour surface. Furthermore, provision can be made here that the decorative layer is applied onto the first shaping contour surface. Provision can be made here that vacuum is generated on the first tool part and/or on the second tool part such that the material lying against the respective contour surface, i.e. the carrier part or the decorative layer, is fixed on the respective contour surface. By moving the tool parts together, a connection of decorative layer and carrier layer takes place. Provision can be made here that a corresponding pressing power is exerted onto the tool parts. Furthermore, provision can be made that the tool parts or one of the tool parts is heated, in order to bring the decorative layer and the carrier part into a state which is particularly capable of connection, e.g. in which a corresponding or layer which lies facing the respectively other connection partner is fused. Alternatively or additionally, an adhesive can also be used, which is applied onto the first surface 10a of the carrier part 10 and/or onto the second surface 20b of the decorative layer 20 before the moving together of the tool parts.

According to a further method for the production of the inner lining part 1, a plasticized mat can be used as starting material for the carrier part 10. Here, the starting material in mat form can be a mat containing a plastic and fibres, and especially can be a polypropylene (PP)-bonded fibre mat. Also, an ABS plastic material (acrylonitrile butadiene styrene copolymer plastic) in particular in the form of plates can be used as starting material for the carrier part 10. In this production method, the material for the carrier part is plasticizable in particular by the supply of heat. To produce the inner lining part 1, the carrier material for forming the carrier part is applied to a first tool part and the decorative material for forming the decorative layer is applied to the second tool part. The tool parts are moved together, wherein a heating of the carrier material is applied for forming the carrier part on a first tool part and the decorative material for forming the decorative layer takes place by heating the respective tool part. In particular here the foam material of the decorative material is fused, so that the foam material is connected with the carrier material. Therefore, the connecting of decorative material and carrier material takes place and, if applicable, also of an intermediate layer and/or of a reinforcement layer by a fusing of decorative material and carrier material with a lying against one another thereof and a pressing on by a pressure which is suitable for the case of application and is preferably light. Depending on the case of application, the carrier material does not need to be heated, because it is already lying in the tool as a plasticized mat. A hardening of the carrier material and decorative material, which are connected to one another, takes place by cooling, so that thereby an inner lining part 1 is formed with a carrier part 10 and a decorative layer 20.

The carrier part 10 of the inner lining part 1 comprises a curvature section 50 with a curvature running along a longitudinal direction L of the carrier part 10 and with a carrier part groove NT running in the region of the curvature section 50 in the longitudinal direction L. The carrier part groove NT is constructed such that it provides on the first surface 10a of the carrier part 10 a depression 60 with a groove depth T60 and on the second surface 10b of the carrier part 10 a bulge 70. In FIG. 1a the longitudinal direction L, a depth direction T and a thickness direction D—with a dashed arrow—of the carrier part 10, which are respectively to be understood as local directions, are entered into FIG. 1a. The longitudinal direction L of the carrier part 10 can be defined in particular as a tangent to the connecting line of the centroids of the carrier part groove NT. The thickness direction D can be defined in particular by the shortest distance between respectively a point of the surface 10a and a point of the surface 10b.

The curvature of the carrier part 10, formed by the curvature region 50, is embodied such that the curvature is formed along the longitudinal direction L and has a curvature direction in which the first surface 10a of the carrier part 10 forms a convex surface in the curvature region 50 in a top view thereon from the visible face S1, and the second surface 10b of the carrier part forms a concave surface in the curvature region 50 in a top view thereon from the rear side S2. Therefore, the respective indicator of the local radius of curvature is situated on the rear side S2 and therefore on the side which is formed by the second surface 10b of the carrier part 10 (FIG. 1).

A first side surface 53 running transversely to the longitudinal direction L forms a first end E1 of the carrier part 10, and a second side surface 54 running transversely to the longitudinal direction L forms a second end E2 of the carrier part 10, which is oriented contrary to the first side surface 53. Likewise, a first longitudinal surface 55 running along to the longitudinal direction L forms a longitudinal end E5 of the carrier part 10, and a second longitudinal surface 56 running along to the longitudinal direction L forms a second longitudinal end E5 of the carrier part 10, which is oriented contrary to the first longitudinal surface 55. The first lateral surface 53 and the second lateral face 54 connect respectively the first surface 10a of the carrier part 10 with its second surface 10b. Likewise, the first side surface 53 and the second side surface 54 connect respectively the first longitudinal surface 55 of the carrier part 10 with its second longitudinal surface 56.

The inner lining part 1 comprises a decorative layer 20 lying on a first surface 10a of the carrier part 10 facing the visible face S1. The decorative layer 20 covers the carrier part groove NT in the region of the curvature section 50 transversely to the longitudinal direction L. The decorative layer 20 lies here against the carrier part groove NT such that a decorative layer groove ND forms on the visible face of the inner lining part 1.

Furthermore, the carrier part 10, viewed in the longitudinal direction L and along the carrier part groove NT, has:
  a first carrier part side region 57 extending from the carrier part groove NT on a first side, with a first side region surface 57a as part of the first surface 10a of the carrier part 10 and a second side region surface 57b as part of the second surface 10b of the carrier part 10,
  a second carrier part side region 58 extending from the carrier part groove NT on a second side, with a first side region surface 58a as part of the first surface 10a of the carrier part 10 and a second side region surface 58b as part of the second surface 10b of the carrier part 10.

The carrier part groove NT for forming the depression 60 has:
  a first side flank 63 adjoining on the first side region surface 57a of the first carrier part side region 57 via a first outer corner region 61,
  a second side flank 64 adjoining on the second side region surface 58a of the second carrier part side region 58 via a second outer corner region 62, which second side flank lies opposite the first side flank 63,
  a first inner corner region 67 adjoining on the first side flank 63, viewed from the first outer corner region 61, a second inner corner region 68 adjoining on the second side flank 64, viewed from the second outer corner region 62, a groove base surface 65 connecting the first inner corner region 67 and the second inner corner region 68.

The carrier part groove NT comprises for forming the depression 60 in the first surface 10a the bulge 70, formed on the surface surface 10b, which is formed by the following features of the second surface 10b:

a first side flank 73 adjoining on the first side region surface 57b of the first carrier part side region 57 via a first inner corner region 71, a second side flank 74 adjoining on the second side region surface 57b of the second carrier part side region 58 via a second inner corner region 72, a first outer corner region 77 adjoining on the first side flank 73, viewed from the first inner corner region 71, a second outer corner region 78 adjoining on the second side flank 74, viewed from the second inner corner region 72, a bulge base surface 75, connecting the first outer corner region 77 and the second outer corner region 78, which bulge base surface is oriented contrary to the groove base surface 65 and runs along it.

The carrier part 10 of the inner lining part 1 comprises in its planar extent in its longitudinal direction L the curvature section 50 to which, viewed in the longitudinal direction L of the component, on margin sections thereof situated contrary to one another, a first carrier part section 51 and a second carrier part section 52 adjoin. According to an embodiment of the inner lining part 1, the curvature section 50 is therefore a transition section connecting the first carrier part section 51 and the second carrier part section 52, such that the first carrier part section 51 in its planar extent and the second carrier part section 52 in its planar extent have as a whole different orientations to one another.

Generally, the carrier part 10 can also be embodied without the first carrier part section 51 and/or the second carrier part section 52. The same then applies to the respective inner lining part 1.

According to the curvature section 50, the carrier part groove NT comprises a groove curvature section 40 situated in the curvature section 50. If applicable, the first carrier part section 51 comprises a first groove section 41 and the second carrier part section 52 comprises a second groove section 42.

The first carrier part section 51 can be embodied so as to be curved in the longitudinal direction L or not curved in this respect. Likewise, the second carrier part section 52 can be embodied so as to be curved in the longitudinal direction L or not curved in this respect. However, the curvature section 50 forms a curvature along the longitudinal direction L with a local radius of curvature, i.e. variable generally along the longitudinal direction L. The variable radius of curvature is generally variable in a depth direction of the carrier part 10 running transversely to the longitudinal direction L, and also in the longitudinal direction L. In the figures, the local radii of curvature are entered as follows:

the local radius of curvature to the first surface 10a of the carrier part 10 in the region of the first carrier part side region 57 and of the second carrier part side region 58 with a corresponding arrow and the reference number KR1a and the local radius of curvature to the first surface 10a of the carrier part 10 in the region of the groove base surface 65 with a corresponding arrow and the reference number KR2a, the local radius of curvature to the second surface 10b of the carrier part 10 in the region of the first carrier part side region 57 and of the second carrier part side region 58 with a corresponding arrow and the reference number KR1b and the local radius of curvature to the second surface 10b of the carrier part 10 in the region of the bulge base surface 75 with a corresponding arrow and the reference number KR2b.

Along the longitudinal direction L and viewed at a constant point of the depth direction T, a minimum of the radii of curvature KR1a, KR2a, KR1b, KR2b is present within the curvature section 50 at least one point. In FIG. 1, by way of example the minimum radius of curvature KR1b-min is entered.

The curvature section 50 extends, viewed in the longitudinal direction L, in particular over a longitudinal region which is 0.5 to 20 times the groove depth T60 at the point with a minimum radius of curvature of the local radius of curvature KR2a. The minimum radius of curvature of the local radius of curvature KR2a can also be a local minimum radius of curvature here over the extent of the inner lining part 1 viewed in the longitudinal direction L, so that it can also have several curvature sections 50 which are connected with one another over respectively an intermediate section or respectively a first carrier part section 51 or respectively a second section 52.

Figure 2:
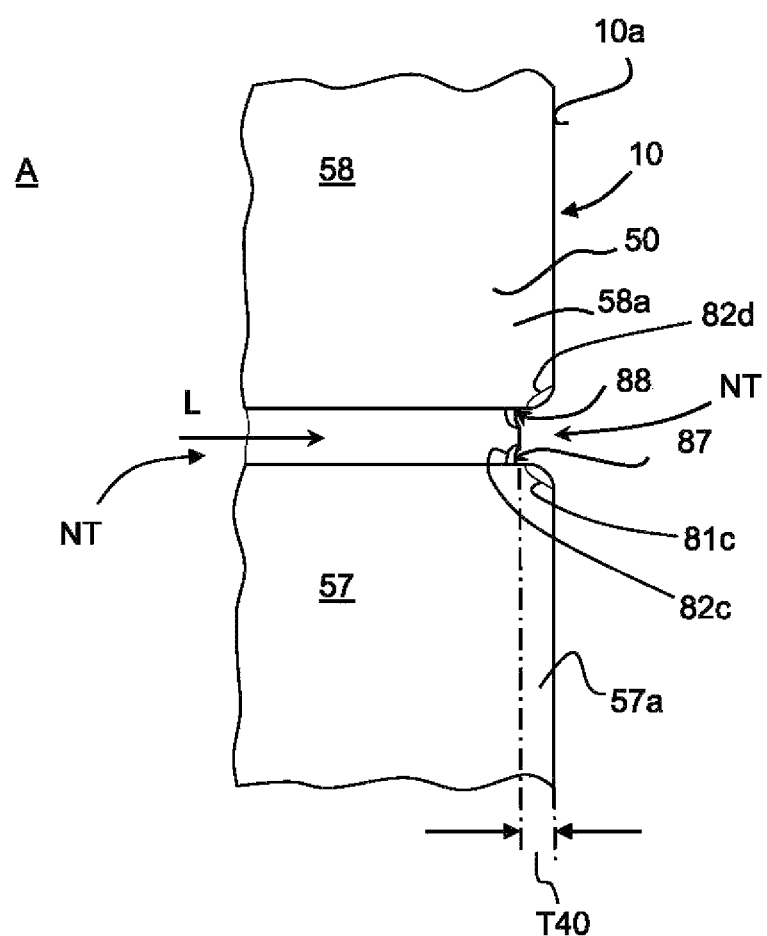
FIG. 2 a side view of the carrier part illustrated in FIGS. 1a and 1b, wherein the side view is produced through the viewing direction A entered in the figure.

According to an embodiment of the inner lining part 1, its carrier part 10 is configured such that the local radius of curvature KR2a becomes smaller from a first carrier part section 51 within the curvature section 50 to a minimum radius of curvature KR2a-min and from there becomes larger again. The corresponding form of the carrier part 10 is illustrated in FIGS. 1 and 2.

To optimize the quality of the inner lining part 1, the carrier part groove NT can have a special configuration through a corresponding shaping of the first surface 10a thereof and in particular of the depression 60:

At least the corner regions 61, 62 and/or the corner regions 67, 68 or the corner regions 61, 62, 67, 68 and 71, 72, 77, 78 can be rounded, viewed in cross-section of the carrier part 10, wherein for the respective rounding respectively a relatively small radius (reference number R61, R62; R81a, R82a) is provided, which in value is e.g. smaller than half or a quarter of the groove depth T60 at the point with a minimum radius of curvature of the local radius of curvature KR2a. The corner regions 61, 62, 67, 68 and 71, 72, 77, 78 can be embodied as edges or as rounded contour regions, in which these can be regarded in an idealized manner as edge lines, as is illustrated in simplified form in FIGS. 1a and 1b.

According to an embodiment, the first outer corner region 61 and/or the second outer corner region 62, i.e. its contour lines running in longitudinal direction L, is flattened locally in a compensation section K in the region of the curvature section 50 along the longitudinal direction L and in the thickness direction D or in the direction of the radius of curvature KR and is therefore formed locally deepened with respect to the course of the first outer corner region 61 or respectively second outer corner region 62 in regions outside the compensation section K. The local depression or recess 81 or respectively 82 thereby occurring, or flattening of the carrier part groove NT or of a margin region thereof is formed in a local thickness direction D of the carrier part 10 and is extended in the longitudinal direction L. A contour line 81a or respectively 82a forms in the region of the respective local depression 81, 82 at the deepest point viewed in the thickness direction D.

The depression begins, viewed in the longitudinal direction L, starting from the carrier part groove NT in the planar extent of the first carrier part section 51 or a first end of the curvature section 50 over an edge or in a curved planar transition. For clarification of the shape of the depression 82 and its boundaries within the carrier part groove NT and by way of indication in the region of the second carrier part side region 58, idealized edge lines 81c, 81d, 82c, 82d are entered in FIGS. 1b, 2 and 3, in so far as they are visible. These edge lines are to be understood in this respect as idealized lines or view lines, because depending on the embodiment these do not have to be actual edge lines, but rather as points at which the contour of the surface 10a through formation of the depression 81, 82 deviates from a contour of the surface 10a which would not have this depression. In FIG. 2 the edge line 82c of the depression 82 is drawn by way of indication in dashed lines in the region of the second carrier part side region 58, which occurs in the illustration of FIG. 2 as a concealed contour line. Furthermore, dashed lines 81e, 82e are presented (FIG. 1b), which are contour lines and preferably no edge lines, and are presented as reference lines for demonstration. These can be understood as centre line of the lines 81c, 81d or respectively 82c, 82d. With this understanding, in an analogous manner the following are presented in FIGS. 1b, 2, 3, in so far as they are present: Contour lines or view lines 87c, 87d, 87e for presentation of the depression 87, and contour lines or view lines 88c, 88d, 88e for presentation of the depression 88.

Through the depressions 81, 82 it is achieved that for folds or thickenings which occur on the rear side 20b of the decorative layer 20 on the latter, a receiving space is provided. In this way, with respect to the planar extent of the first surface 20a of the decorative layer 20, no thickenings can form on this first surface 20a in the curvature region 50 and there at the respective corner region 61, 62 provided with a depression. In FIGS. 4 and 6 the folds or thickenings occurring in the regions on the rear side 20b of the decorative layer 20 are given the reference numbers F61 or respectively F62. The folds or thickenings on the rear side 20b of the decorative layer 20 occur in particular in that the decorative layer 20 is formed so as to be flexibly deformable, but not plastically deformable, the curvature section is formed so as to be curved with a radius KR1a, KR2a, in addition the corner region 61, 62 without the presences of a depression is provided with a margin curvature with a radius R61 or respectively R62, which is compressed on the rear side 20b of the decorative layer 20 when the latter at this point of the longitudinal direction L is laminated onto the carrier part 10, and thereby accumulates material in the direction of the carrier part.

Figure 3:
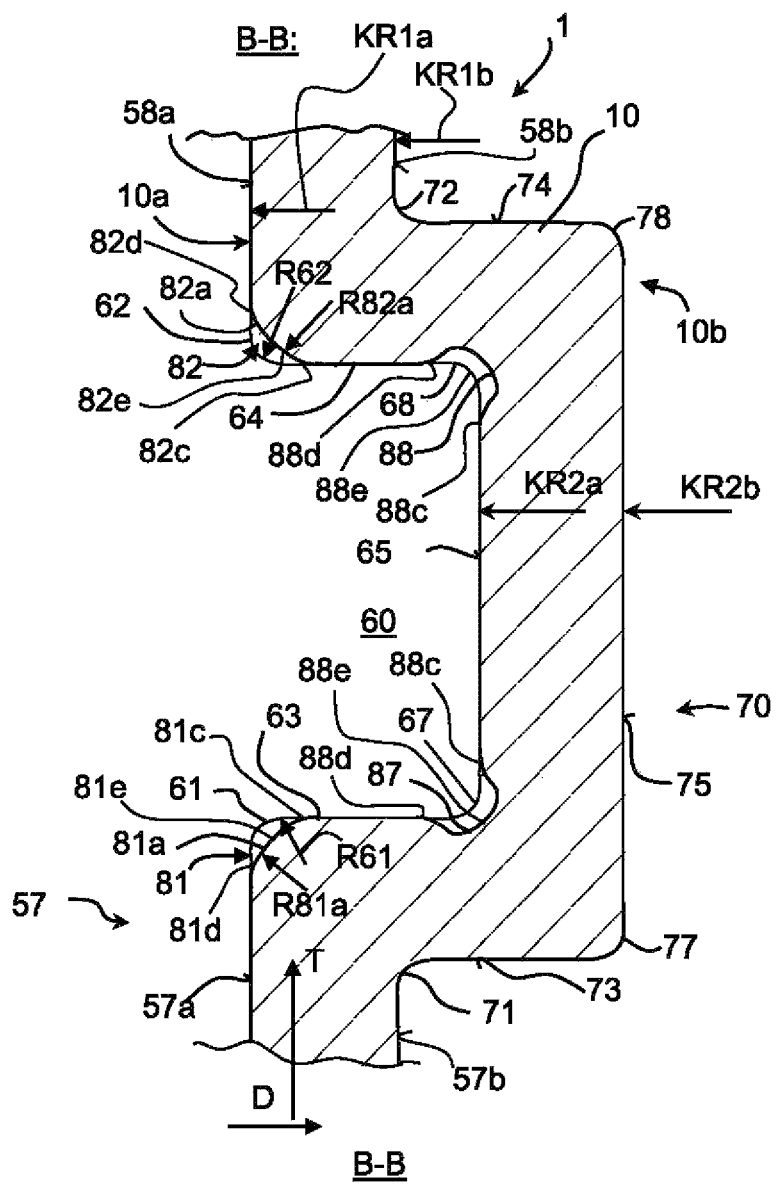
FIG. 3 a partial section of an embodiment of the carrier part of a cross-section along the section line B-B entered in FIG. 1a and in the direction of the arrows entered there, wherein the partial section is made in a region of the carrier part in which the carrier part has a curvature extending extensively along the longitudinal direction of the carrier part.

In the embodiment of FIG. 3, the first outer corner region 61 and the second outer corner region 62 is formed so as to be locally flattened in the region of the curvature section 50, viewed along the longitudinal direction L. Through the depressions 81, 82, a local radius R81a or respectively R82a along the cross-section contour line forms at the corner region 81a, 82a, which local radius is greater than the corresponding local radius R61 or respectively R62 of the corner region 61 or respectively 62. Here, the contour line 81a, 82a of the deepened region 61 or respectively 62, occurring in the cross-section illustration of FIG. 3, comprises a consistent curvature, i.e. no turning point. The thereby resulting local depression 81 or respectively 82 is formed along the longitudinal direction L as a flattening, viewed in a local thickness direction D of the carrier part 10.

In the embodiment of FIG. 5, the first outer corner region 61 and the second outer corner region 62 is formed in the region of the curvature section 50, viewed along the longitudinal direction L, locally with an additional depression with respect to a flattening. For this, the cross-section contour lines 181a, 182a of the depressions 181 or respectively 182, formed in the curvature section 50, have two turning points therein. Through the shape, resulting therefrom, of the respective depression 181 or respectively 182, the decorative layer 20 is provided on its rear side 20b with a particularly large receiving space to receive material of the decorative layer 20.

According to an embodiment, on the first second surface 10b of the carrier part 10, instead of the inner corner regions 71, 72 a bulge 171 or respectively 172 is formed, in order to compensate for the material weakening occurring for the formation of the depressions 181, 182.

According to an embodiment, as illustrated in FIGS. 3 to 6, also—viewed in the longitudinal direction L—starting from the inner corner regions 67, 68 a corner region 87 or respectively 88 is formed for the formation of an additional depression with respect to the shape of the groove in its other extent. Such corner regions 87 or respectively 88 are optionally possible for the formation of an additional depression.

Figure 7:
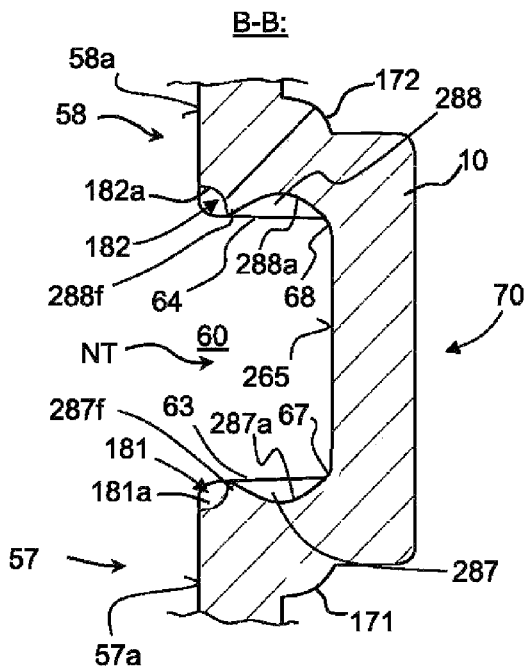
FIG. 7 a partial section of a further embodiment of the carrier part along the section line B-B entered in FIG. 1.
Figure 8:
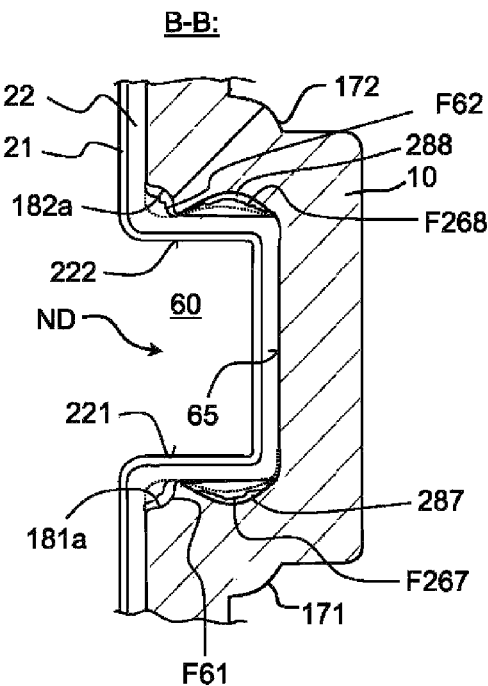
FIG. 8 a partial section of an embodiment of the inner lining part according to the invention corresponding to the illustration of FIG. 7, with the carrier part illustrated in FIG. 7 and with a decorative layer situated thereon.

In FIGS. 7 and 8 a further embodiment of the inner lining part is illustrated. Here, the side flanks 63 and 64 of the carrier part groove NT are formed into the carrier part 10 at a point along the longitudinal direction L in the curvature section 50 away from the depression 60 and therefore—relative to the shape of the respective side flank 263 or respectively 264 of the carrier part groove NT outside this shaping and in particular outside the curvature section 50—constitute a local depression or recess 287 or respectively 288 of the side flanks 64 and 64, viewed from the depression 60. For this, the surfaces 287a or respectively 288a as sections of the side flanks 63, 64 are local depressions of the side flanks 63, 64. The position of the local depression or recess 287 or respectively 288 in longitudinal direction L and the size are in particular as described by means of the depression 81, 82 by means e.g. of FIG. 3. The local depression or recess 287 or respectively 288 extend in the embodiment of FIGS. 7 and 8 viewed in the thickness direction D only in the region of the side flank. In the embodiment of the inner lining part 1 of FIG. 7, the carrier part groove NT is widened at this point on the one hand by the depressions 287 or respectively 288 and additionally by a depression 181, 182 described by means of FIGS. 5 and 6. The depressions 181 and 287 or respectively 182 and 288, viewed in profile cross-section (FIG. 7), are respectively separated by an elevation 287f, 288f. As shown in FIG. 8, on a side flank 63 or respectively 64 both folds F61 or respectively F62 and also folds F267 or respectively F268 can be deposited into the respective depressions 181 and 287 or respectively 182 and 288, so that viewed from the depression 60 a consistent surface 221, 222 of the decorative layer 20 appears as outside the site, at which the depressions 181 and 287 or respectively 182 and 288 are formed, and in particular outside the curvature section 50.

According to an embodiment of the inner lining part, provision can be made that a depression 181 or respectively 182 and 287 or respectively 288 is formed only on one of the two side flanks 63, 64.

In a further embodiment, the elevation 287f, 288f occurring in the embodiment of FIG. 7 can be dispensed with, so that the depressions 181, 287 or respectively 182, 288 together form a cohesive, i.e. a single, depression.

Figure 9:
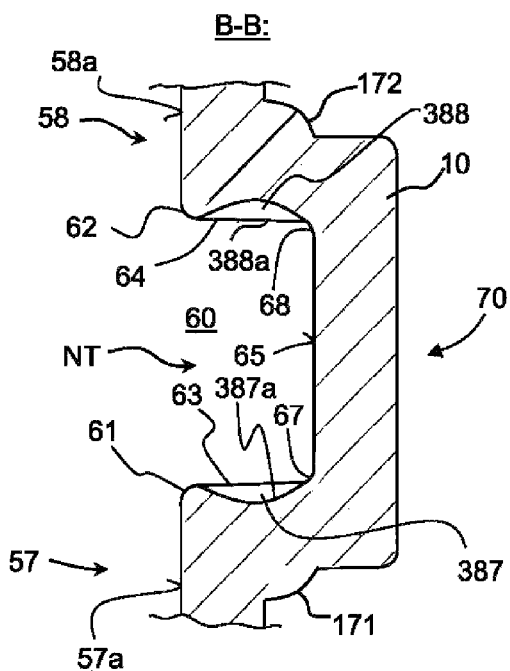
FIG. 9 a partial section of a further embodiment of the carrier part along the section line B-B entered in FIG. 1.
Figure 10:
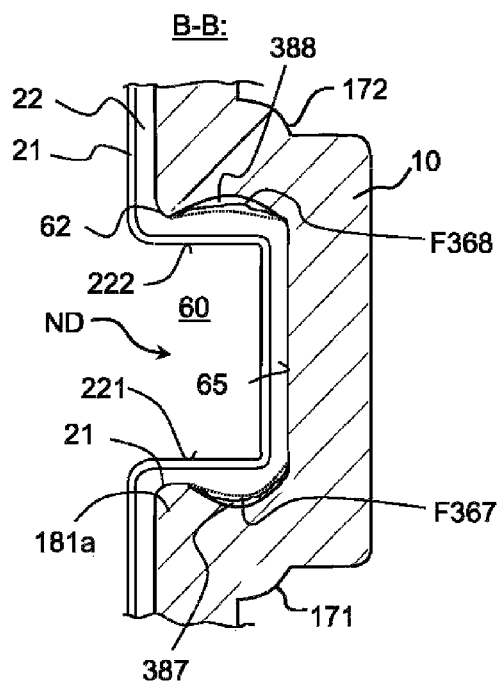
FIG. 10 a partial section of an embodiment of the inner lining part according to the invention corresponding to the illustration of FIG. 9, with the carrier part illustrated in FIG. 9 and with a decorative layer situated thereon.

In FIGS. 9 and 10 a further embodiment of the inner lining part 1 is illustrated. In this, only the side flanks 63 and 64 of the carrier part groove NT are formed into the carrier part 10 at a point along the longitudinal direction L in the curvature section 50 away from the depression 60. A depression 181, 182 as in the embodiment of FIG. 7 are not provided in the embodiment of FIGS. 9 and 10. Viewed in longitudinal direction L, in the region of the depressions or recesses 387, 388 no depression of the corner regions 61, 62 is formed. The depressions or recesses 387, 388 are therefore provided only in the region of the side flanks 63, 64, viewed in the profile cross-section of FIGS. 9 and 10. For this, the surfaces 387a or respectively 388a as sections of the side flanks 63 or respectively 64 are local depressions of the side flanks 63 or respectively 64.

According to an embodiment of the inner lining part 1, provision can be made that a depression 287 or respectively 288 is formed only in one of the two side flanks 63, 64.

In the embodiments of FIGS. 9 and 10, it is achieved in particular that the first surface 20a of the decorative layer 20 is held in a defined position at the corner regions 61 or respectively 62 and in the region of the groove base surface 65, by these being formed locally without depressions, and in the regions of the side flanks 63 or respectively 64 space is provided for the depositing of folds or thickenings of the decorative layer on its second surface 20b.

Therefore, according to an embodiment of the inner lining part, provision is made that the carrier part groove NT situated between two carrier part side regions 57, 58 is formed from two side flanks 63, 64 lying opposite one another and a groove base surface 65 connecting these, and in the curvature section 50 in at least one side flank 63, 64 comprises a recess extending in the longitudinal direction L and from the groove depression 60.

Generally, the lines illustrated in the figures, which represent the depressions or recesses 63, 64, 87, 88, 287, 288, 387, 388, in the realization of the inner lining part 1 are preferably only view lines which are not visible or detectable as edges.

Figure 11:
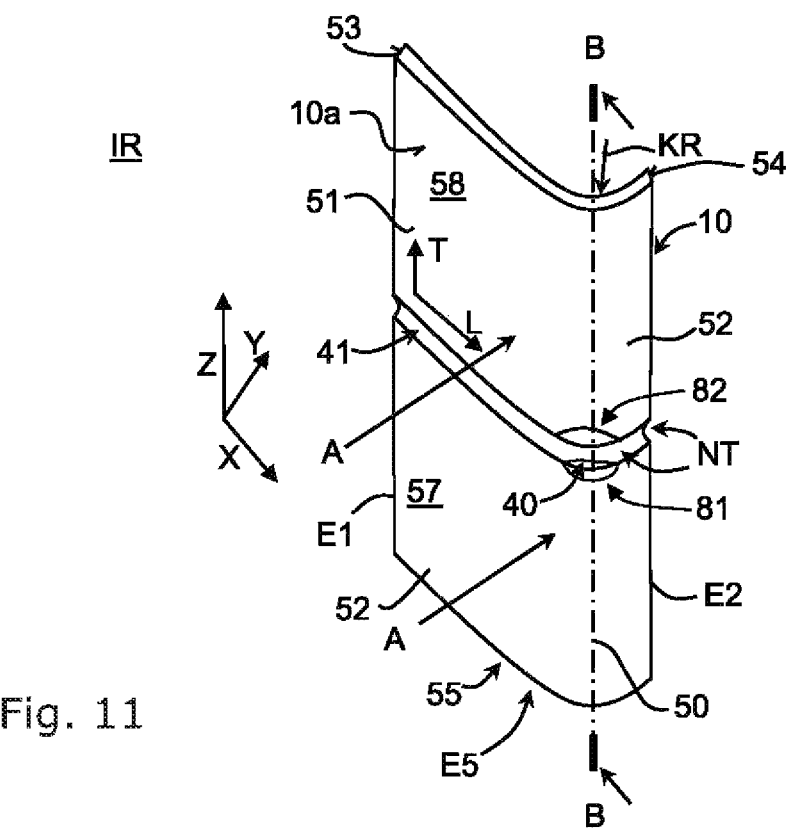
FIG. 11 a perspective diagrammatic representation of a carrier part of a further embodiment of the inner lining part according to the invention, wherein the carrier part comprises a carrier part groove running in a longitudinal direction of the carrier part, which carrier part groove is configured as a V-groove, in contrast to the carrier part groove shown in FIG. 1.

The carrier part groove NT can be shaped in various ways and comprises in particular an idealized edge line situated in particular on the margin of the first carrier part side region 57 or of the second carrier part side region 58, which edge line forms a depression or flattening at a compensation section K. The carrier part groove NT can be formed so as to be rectangular, viewed in cross-section (FIG. 1) or so as to be V-shaped in cross-section (FIG. 11).

The inner lining part 1 can be, in particular, a door lining part, in which in particular the second section 52 of the inner lining part 1 on its installation in a vehicle is situated at the hinge joint of the vehicle door, whereas the first section 51 of the inner lining part 1 is situated at the pivotable end of the vehicle door.

The invention claimed is:

1. An inner lining part for the interior of a motor vehicle, comprising:
   a carrier part, which comprises a curvature section having a curvature running along a longitudinal direction of the carrier part and having a carrier part groove running in the region of the curvature section in the longitudinal direction, wherein the curvature section has a first surface that is convex in the longitudinal direction and that includes the carrier part groove; and
   a decorative layer lying on the first surface of the carrier part forming a visible face of the inner lining part, wherein the decorative layer covers the carrier part groove in the region of the curvature section so that the inner lining part includes a decorative layer groove on the visible face of the inner lining part,
   wherein the carrier part includes at least two corner regions, lying opposite one another in the curvature section, from which the carrier part groove, situated between two carrier part side regions, extends as a depression, and wherein one of the at least two corner regions includes a recess formed with respect to the course of the curvature of the curvature section at that one corner region, so that the course of a first surface of the decorative layer which forms the visible face of the inner lining part corresponds to the course of the curvature at the carrier part side region that is adjacent that one corner region, because folds or thickenings, which form owing to the curvature of the decorative layer on the second surface thereon, are received by the recess.

2. The inner lining part according to claim 1, wherein the decorative layer is single-layered and comprises leather or artificial leather.

3. The inner lining part according to claim 1, wherein the decorative layer is formed from a covering film and a foam layer situated between the covering film and the carrier part.

4. The inner lining part according to claim 1, wherein the carrier part groove is situated between two carrier part side regions and is formed from two side flanks lying opposite one another and a groove base surface connecting the side flanks, and wherein at least one of the side flanks includes a recess extending in the longitudinal direction.

5. The inner lining part according to claim 1, wherein the carrier part groove is situated between two carrier part side regions and is formed from two side flanks lying opposite one another and a groove base surface connecting the side flanks, and wherein the groove base surface or a transition region between the groove base surface and at least one of the side flanks includes a recess extending in the longitudinal direction.

6. The inner lining part according to claim 1, wherein the inner lining part is a door lining part of a vehicle door.

7. The inner lining part according to claim 1, wherein the carrier part groove runs on the inner lining part such that in relation to an installed state of the inner lining part in a vehicle it extends along a fore-and-aft direction of the vehicle or in a direction running between a margin section of the vehicle door, on which the vehicle door is rotatably hung on the vehicle body, and a free pivotable margin section of the vehicle door.

8. An inner lining part for the interior of a motor vehicle, comprising:
   a carrier part, which comprises a curvature section having a curvature running along a longitudinal direction of the carrier part and having a carrier part groove running in the region of the curvature section in the longitudinal direction, wherein the curvature section has a first surface that is convex in the longitudinal direction and that includes the carrier part groove; and
   a decorative layer lying on the first surface of the carrier part forming a visible face of the inner lining part, wherein the decorative layer covers the carrier part groove in the region of the curvature section so that the inner lining part includes a decorative layer groove on the visible face of the inner lining part,
   wherein the carrier part groove is situated between two carrier part side regions and is formed from two side flanks lying opposite one another and a groove base surface connecting the side flanks, and wherein at least one of the side flanks includes a recess extending in the longitudinal direction.

9. The inner lining part according to claim 8, wherein the decorative layer is single-layered and comprises leather or artificial leather.

10. The inner lining part according to claim 8, wherein the decorative layer is formed from a covering film and a foam layer situated between the covering film and the carrier part.

11. The inner lining part according to claim 8, wherein the carrier part includes at least two corner regions, lying opposite one another in the curvature section, from which the carrier part groove, situated between two carrier part side regions, extends as a depression, and wherein one of the at least two corner regions includes a recess formed with respect to the course of the curvature of the curvature section at that one corner region, so that the course of a first surface of the decorative layer which forms the visible face of the inner lining part corresponds to the course of the curvature at the carrier part side region that is adjacent that one corner region, because folds or thickenings, which form owing to the curvature of the decorative layer on the second surface thereon, are received by the recess.

12. The inner lining part according to claim 8, wherein the inner lining part is a door lining part of a vehicle door.

13. The inner lining part according to claim 8, wherein the carrier part groove runs on the inner lining part such that in relation to an installed state of the inner lining part in a vehicle it extends along a fore-and-aft direction of the vehicle or in a direction running between a margin section of the vehicle door, on which the vehicle door is rotatably hung on the vehicle body, and a free pivotable margin section of the vehicle door.

14. An inner lining part for the interior of a motor vehicle, comprising:
a carrier part, which comprises a curvature section having a curvature running along a longitudinal direction of the carrier part and having a carrier part groove running in the region of the curvature section in the longitudinal direction, wherein the curvature section has a first surface that is convex in the longitudinal direction and that includes the carrier part groove; and
a decorative layer lying on the first surface of the carrier part forming a visible face of the inner lining part, wherein the decorative layer covers the carrier part groove in the region of the curvature section so that the inner lining part includes a decorative layer groove on the visible face of the inner lining part,
wherein the carrier part groove is situated between two carrier part side regions and is formed from two side flanks lying opposite one another and a groove base surface connecting the side flanks, and wherein the groove base surface or a transition region between the groove base surface and at least one of the side flanks includes a recess extending in the longitudinal direction.

15. The inner lining part according to claim 14, wherein the decorative layer is single-layered and comprises leather or artificial leather.

16. The inner lining part according to claim 14, wherein the decorative layer is formed from a covering film and a foam layer situated between the covering film and the carrier part.

17. The inner lining part according to claim 14, wherein the carrier part includes at least two corner regions, lying opposite one another in the curvature section, from which the carrier part groove, situated between two carrier part side regions, extends as a depression, and wherein one of the at least two corner regions includes a recess formed with respect to the course of the curvature of the curvature section at that one corner region, so that the course of a first surface of the decorative layer which forms the visible face of the inner lining part corresponds to the course of the curvature at the carrier part side region that is adjacent that one corner region, because folds or thickenings, which form owing to the curvature of the decorative layer on the second surface thereon, are received by the recess.

18. The inner lining part according to claim 14, wherein the inner lining part is a door lining part of a vehicle door.

19. The inner lining part according to claim 14, wherein the carrier part groove runs on the inner lining part such that in relation to an installed state of the inner lining part in a vehicle it extends along a fore-and-aft direction of the vehicle or in a direction running between a margin section of the vehicle door, on which the vehicle door is rotatably hung on the vehicle body, and a free pivotable margin section of the vehicle door.

* * * * *